United States Patent
Johnson et al.

(10) Patent No.: US 8,684,101 B2
(45) Date of Patent: Apr. 1, 2014

(54) FRANGIBLE SHAPE MEMORY ALLOY FIRE SPRINKLER VALVE ACTUATOR

(75) Inventors: Alfred David Johnson, San Leandro, CA (US); Roger Graham Gilbertson, Novato, CA (US); Valery Martynov, San Francisco, CA (US)

(73) Assignee: TiNi Alloy Company, Berkeley, CA (US)

( * ) Notice: Subject to any disclaimer, the term of this patent is extended or adjusted under 35 U.S.C. 154(b) by 85 days.

(21) Appl. No.: 12/019,553

(22) Filed: Jan. 24, 2008

(65) Prior Publication Data

US 2009/0095493 A1    Apr. 16, 2009
US 2010/0025050 A2    Feb. 4, 2010

Related U.S. Application Data

(60) Provisional application No. 60/897,708, filed on Jan. 25, 2007.

(51) Int. Cl.
*A62C 37/08* (2006.01)

(52) U.S. Cl.
USPC ............... 169/37; 169/38; 169/41; 169/42; 137/68.15; 137/72

(58) Field of Classification Search
USPC ........... 169/37–41, 90, 42, 54; 137/67, 68.15, 137/72
See application file for complete search history.

(56) References Cited

U.S. PATENT DOCUMENTS

| | | | |
|---|---|---|---|
| 368,425 A * | 8/1887 | Ross et al. | 169/41 |
| 538,593 A * | 4/1895 | Naylor, Jr. | 169/39 |
| 1,560,335 A | 11/1925 | Czochralski | |
| 1,904,828 A | 4/1933 | Green | |
| 1,913,035 A | 6/1933 | Loepsinger | |
| 1,926,925 A | 9/1933 | Wescott | |
| 2,060,593 A | 11/1936 | Schaurte et al. | |
| 2,371,614 A | 3/1945 | Graves | |
| 2,586,556 A | 2/1952 | Mullikin | |
| 2,608,996 A | 9/1952 | Forman | |
| 2,610,300 A | 9/1952 | Walton et al. | |
| 2,647,017 A | 7/1953 | Coulliette | |
| 2,793,036 A | 5/1957 | Hansburg | |
| 2,911,504 A | 11/1959 | Cohn | |

(Continued)

FOREIGN PATENT DOCUMENTS

| | | |
|---|---|---|
| EP | 0053596 | 6/1982 |
| EP | 0310439 | 4/1989 |

(Continued)

OTHER PUBLICATIONS

Johnson, David et al.; U.S. Appl. No. 10/972,745 entitled "Non-explosive releasable coupling device," filed Oct. 25, 2004.

(Continued)

*Primary Examiner* — Steven J Ganey
(74) *Attorney, Agent, or Firm* — Shay Glenn LLP

(57) ABSTRACT

A temperature-activated valve for a conventional fire sprinkler utilizing a hyperelastic single-crystal shape memory alloy is described. The shape-memory element expands as it is heated, forcing a bolt to break, thereby opening the sprinkler valve. The devices described are less susceptible to accidental breakage than conventional actuators, and have fewer moving parts. Transition temperature of the shape memory alloy can be tuned to a narrow range.

25 Claims, 10 Drawing Sheets

(56) References Cited

U.S. PATENT DOCUMENTS

| | | | |
|---|---|---|---|
| 3,229,956 A | 1/1966 | White | |
| 3,351,463 A | 11/1967 | Rozner et al. | |
| 3,357,432 A | 12/1967 | Sparks | |
| 3,400,906 A | 9/1968 | Stocklin | |
| 3,408,890 A | 11/1968 | Bochman, Jr. | |
| 3,435,823 A | 4/1969 | Edwards | |
| 3,445,086 A | 5/1969 | Quinn | |
| 3,454,286 A | 7/1969 | Anderson et al. | |
| 3,546,996 A | 12/1970 | Grijalva et al. | |
| 3,559,641 A | 2/1971 | Lay | |
| 3,561,537 A | 2/1971 | Dix et al. | |
| 3,613,732 A | 10/1971 | Willson et al. | |
| 3,620,212 A | 11/1971 | Fannon, Jr. et al. | |
| 3,659,625 A | 5/1972 | Coiner et al. | |
| 3,668,131 A | 6/1972 | Banush et al. | |
| 3,725,835 A | 4/1973 | Hopkins et al. | |
| 3,789,838 A | 2/1974 | Fournier et al. | |
| 3,849,756 A | 11/1974 | Hickling | |
| 3,888,975 A | 6/1975 | Ramwell | |
| 3,913,572 A | 10/1975 | Wheeler | |
| 3,918,443 A | 11/1975 | Vennard et al. | |
| 3,974,844 A | 8/1976 | Pimentel | |
| 3,991,898 A | 11/1976 | Hanson et al. | |
| 4,055,955 A | 11/1977 | Johnson | |
| 4,063,831 A | 12/1977 | Meuret | |
| 4,072,159 A | 2/1978 | Kurosawa | |
| 4,096,993 A | 6/1978 | Behr | |
| 4,145,764 A | 3/1979 | Kuzuki et al. | |
| 4,151,064 A | 4/1979 | Kuehnle | |
| 4,176,719 A * | 12/1979 | Bray | 169/39 |
| 4,177,327 A | 12/1979 | Mathews | |
| 4,195,773 A | 4/1980 | Ogden | |
| 4,243,963 A | 1/1981 | Jameel et al. | |
| 4,265,684 A | 5/1981 | Boll | |
| 4,279,190 A | 7/1981 | Hummel | |
| 4,279,790 A | 7/1981 | Nakajima | |
| 4,340,049 A | 7/1982 | Munsch | |
| 4,434,855 A * | 3/1984 | Given, Jr. | 169/37 |
| 4,485,545 A | 12/1984 | Caverly | |
| 4,501,058 A | 2/1985 | Schutzler | |
| 4,524,343 A | 6/1985 | Morgan et al. | |
| 4,549,717 A | 10/1985 | Dewaegheneire | |
| 4,551,974 A | 11/1985 | Yaeger et al. | |
| 4,553,393 A | 11/1985 | Ruoff | |
| 4,553,602 A | 11/1985 | Pieczykolan | |
| 4,558,715 A | 12/1985 | Walton et al. | |
| 4,567,549 A | 1/1986 | Lemme | |
| 4,585,209 A | 4/1986 | Aine et al. | |
| 4,589,179 A | 5/1986 | Hulting, Jr. | |
| 4,596,483 A | 6/1986 | Gabriel | |
| 4,619,284 A | 10/1986 | Delarue et al. | |
| 4,654,191 A | 3/1987 | Krieg | |
| 4,684,913 A | 8/1987 | Yaeger | |
| 4,706,758 A | 11/1987 | Johnson | |
| 4,753,465 A | 6/1988 | Dalby | |
| 4,821,997 A | 4/1989 | Zdeblick | |
| 4,823,607 A | 4/1989 | Howe et al. | |
| 4,824,073 A | 4/1989 | Zdeblick | |
| 4,848,388 A | 7/1989 | Waldbusser | |
| 4,854,797 A | 8/1989 | Gourd | |
| 4,864,824 A | 9/1989 | Gabriel et al. | |
| 4,893,655 A | 1/1990 | Anderson | |
| 4,896,728 A | 1/1990 | Wolff et al. | |
| 4,943,032 A | 7/1990 | Zdeblick | |
| 5,044,947 A | 9/1991 | Sachdeva et al. | |
| 5,060,888 A | 10/1991 | Vezain et al. | |
| 5,061,137 A | 10/1991 | Gourd | |
| 5,061,914 A | 10/1991 | Busch et al. | |
| 5,069,419 A | 12/1991 | Jerman | |
| 5,072,288 A | 12/1991 | MacDonald et al. | |
| 5,102,276 A | 4/1992 | Gourd | |
| 5,114,504 A | 5/1992 | AbuJudom, II et al. | |
| 5,116,252 A | 5/1992 | Hartman | |
| 5,117,916 A | 6/1992 | Ohta et al. | |
| 5,119,555 A | 6/1992 | Johnson | |
| 5,129,753 A | 7/1992 | Wesley et al. | |
| 5,131,843 A | 7/1992 | Hilgers et al. | |
| 5,160,233 A | 11/1992 | McKinnis | |
| 5,190,546 A | 3/1993 | Jervis | |
| 5,192,147 A | 3/1993 | McCloskey | |
| 5,211,371 A | 5/1993 | Coffee | |
| 5,218,998 A | 6/1993 | Bakken et al. | |
| 5,245,738 A | 9/1993 | Johnson | |
| 5,309,717 A | 5/1994 | Minch | |
| 5,312,152 A | 5/1994 | Woebkenberg, Jr. et al. | |
| 5,312,247 A | 5/1994 | Sachdeva et al. | |
| 5,325,880 A | 7/1994 | Johnson et al. | |
| 5,344,117 A | 9/1994 | Trah et al. | |
| 5,364,046 A | 11/1994 | Dobbs et al. | |
| 5,395,238 A | 3/1995 | Andreiko et al. | |
| 5,447,432 A | 9/1995 | Andreiko et al. | |
| 5,456,600 A | 10/1995 | Andreiko et al. | |
| 5,474,448 A | 12/1995 | Andreiko et al. | |
| 5,474,563 A | 12/1995 | Myler et al. | |
| 5,494,113 A | 2/1996 | Polan | |
| 5,502,982 A | 4/1996 | Venetucci | |
| 5,543,349 A | 8/1996 | Kurtz et al. | |
| 5,605,543 A | 2/1997 | Swanson | |
| 5,619,177 A | 4/1997 | Johnson et al. | |
| 5,622,225 A | 4/1997 | Sundholm | |
| 5,640,217 A | 6/1997 | Hautcoeur et al. | |
| 5,641,364 A | 6/1997 | Golberg et al. | |
| 5,645,423 A | 7/1997 | Collins, Jr. | |
| 5,658,515 A | 8/1997 | Lee et al. | |
| 5,676,356 A | 10/1997 | Ekonen et al. | |
| 5,683,245 A | 11/1997 | Sachdeva et al. | |
| 5,695,504 A | 12/1997 | Gifford, III et al. | |
| 5,714,690 A | 2/1998 | Burns et al. | |
| 5,722,989 A | 3/1998 | Fitch et al. | |
| 5,771,742 A | 6/1998 | Bokaie et al. | |
| 5,772,378 A | 6/1998 | Keto-Tokoi | |
| 5,772,864 A | 6/1998 | Moller et al. | |
| 5,796,152 A | 8/1998 | Carr et al. | |
| 5,819,749 A | 10/1998 | Lee et al. | |
| 5,825,275 A | 10/1998 | Wuttig et al. | |
| 5,837,394 A | 11/1998 | Schumm, Jr. | |
| 5,840,199 A | 11/1998 | Warren | |
| 5,850,837 A | 12/1998 | Shiroyama et al. | |
| 5,867,302 A | 2/1999 | Fleming | |
| 5,903,099 A | 5/1999 | Johnson et al. | |
| 5,916,178 A | 6/1999 | Noone et al. | |
| 5,924,492 A * | 7/1999 | Kikuchi et al. | 169/37 |
| 5,930,651 A | 7/1999 | Terasawa | |
| 5,960,812 A | 10/1999 | Johnson | |
| 6,013,854 A | 1/2000 | Moriuchi | |
| 6,042,374 A | 3/2000 | Farzin-Nia et al. | |
| 6,042,553 A | 3/2000 | Solar et al. | |
| 6,072,617 A | 6/2000 | Henck | |
| 6,073,700 A | 6/2000 | Tsuji et al. | |
| 6,075,239 A | 6/2000 | Aksyuk et al. | |
| 6,080,160 A | 6/2000 | Chen | |
| 6,084,849 A | 7/2000 | Durig et al. | |
| 6,096,175 A | 8/2000 | Roth | |
| 6,101,164 A | 8/2000 | Kado et al. | |
| 6,107,004 A | 8/2000 | Donadio, III | |
| 6,110,204 A | 8/2000 | Lazarov et al. | |
| 6,123,153 A * | 9/2000 | Finnegan | 169/37 |
| 6,124,523 A | 9/2000 | Banas et al. | |
| 6,126,371 A | 10/2000 | McCloskey | |
| 6,129,153 A * | 10/2000 | Joung | 169/37 |
| 6,139,143 A | 10/2000 | Brune et al. | |
| 6,169,269 B1 | 1/2001 | Maynard | |
| 6,195,478 B1 | 2/2001 | Fouquet | |
| 6,203,715 B1 | 3/2001 | Kim et al. | |
| 6,224,626 B1 | 5/2001 | Steinke | |
| 6,229,640 B1 | 5/2001 | Zhang | |
| 6,247,493 B1 | 6/2001 | Henderson | |
| 6,277,133 B1 | 8/2001 | Kanesaka | |
| 6,284,067 B1 | 9/2001 | Schwartz et al. | |
| 6,352,494 B2 | 3/2002 | McAlonan | |
| 6,358,380 B1 | 3/2002 | Mann et al. | |
| 6,379,383 B1 | 4/2002 | Palmaz et al. | |
| 6,386,507 B2 | 5/2002 | Dhuler et al. | |
| 6,406,605 B1 | 6/2002 | Moles | |

(56) References Cited

U.S. PATENT DOCUMENTS

| | | |
|---|---|---|
| 6,407,478 B1 | 6/2002 | Wood et al. |
| 6,410,360 B1 | 6/2002 | Steenberge |
| 6,447,478 B1 | 9/2002 | Maynard |
| 6,451,668 B1 | 9/2002 | Neumeier et al. |
| 6,454,913 B1 | 9/2002 | Rasmussen et al. |
| 6,470,108 B1 | 10/2002 | Johnson |
| 6,475,261 B1 | 11/2002 | Matsumoto et al. |
| 6,524,322 B1 | 2/2003 | Berreklouw |
| 6,533,905 B2 | 3/2003 | Johnson et al. |
| 6,537,310 B1 | 3/2003 | Palmaz et al. |
| 6,582,985 B2 | 6/2003 | Cabuz et al. |
| 6,592,724 B1 | 7/2003 | Rasmussen et al. |
| 6,596,102 B2 | 7/2003 | Homma |
| 6,605,111 B2 | 8/2003 | Bose et al. |
| 6,614,570 B2 | 9/2003 | Johnson et al. |
| 6,620,634 B2 | 9/2003 | Johnson et al. |
| 6,624,730 B2 | 9/2003 | Johnson et al. |
| 6,669,794 B1 | 12/2003 | Bellouard et al. |
| 6,669,795 B2 | 12/2003 | Johnson et al. |
| 6,672,502 B1 | 1/2004 | Paul et al. |
| 6,688,828 B1 | 2/2004 | Post |
| 6,729,599 B2 | 5/2004 | Johnson |
| 6,742,761 B2 | 6/2004 | Johnson et al. |
| 6,746,890 B2 | 6/2004 | Gupta et al. |
| 6,771,445 B1 | 8/2004 | Hamann et al. |
| 6,790,298 B2 | 9/2004 | Johnson et al. |
| 6,805,898 B1 | 10/2004 | Wu et al. |
| 6,811,910 B2 | 11/2004 | Tsai et al. |
| 6,840,329 B2 | 1/2005 | Kikuchi et al. |
| 6,843,465 B1 | 1/2005 | Scott |
| 6,849,085 B2 | 2/2005 | Marton |
| 6,852,132 B1 | 2/2005 | Houser et al. |
| 6,908,275 B2 | 6/2005 | Nelson et al. |
| 6,918,545 B2 * | 7/2005 | Franson et al. .............. 239/37 |
| 6,920,966 B2 | 7/2005 | Buchele et al. |
| 6,955,187 B1 | 10/2005 | Johnson |
| 7,022,173 B2 | 4/2006 | Cummings et al. |
| 7,040,323 B1 | 5/2006 | Menchaca et al. |
| 7,044,596 B2 | 5/2006 | Park |
| 7,073,504 B2 | 7/2006 | Callister et al. |
| 7,084,726 B2 | 8/2006 | Gupta et al. |
| 7,201,367 B2 | 4/2007 | Wietharn |
| 7,524,914 B2 | 4/2009 | Mather et al. |
| 7,632,361 B2 * | 12/2009 | Johnson et al. ............ 148/402 |
| 7,736,687 B2 | 6/2010 | Sims et al. |
| 7,793,911 B2 | 9/2010 | Fontana et al. |
| 2001/0023010 A1 | 9/2001 | Yamada et al. |
| 2002/0018325 A1 | 2/2002 | Nakatani et al. |
| 2002/0062154 A1 | 5/2002 | Ayers |
| 2002/0106614 A1 | 8/2002 | Prince et al. |
| 2002/0192617 A1 | 12/2002 | Phan et al. |
| 2003/0002994 A1 | 1/2003 | Johnson et al. |
| 2003/0078465 A1 | 4/2003 | Pai et al. |
| 2003/0170130 A1 | 9/2003 | Johnson |
| 2004/0083006 A1 | 4/2004 | Ellingsen |
| 2004/0200551 A1 | 10/2004 | Brhel et al. |
| 2004/0221614 A1 | 11/2004 | Holemans et al. |
| 2004/0243219 A1 | 12/2004 | Fischer et al. |
| 2004/0249399 A1 | 12/2004 | Cinquin et al. |
| 2005/0113933 A1 | 5/2005 | Carter et al. |
| 2006/0118210 A1 | 6/2006 | Johnson |
| 2006/0204738 A1 | 9/2006 | Dubrow et al. |
| 2006/0213522 A1 | 9/2006 | Menchaca et al. |
| 2006/0232374 A1 | 10/2006 | Johnson |
| 2006/0240953 A1 | 10/2006 | Shahinpoor |
| 2007/0137740 A1 | 6/2007 | Johnson et al. |
| 2007/0173787 A1 | 7/2007 | Huang et al. |
| 2007/0207321 A1 | 9/2007 | Abe et al. |
| 2007/0246233 A1 | 10/2007 | Johnson |
| 2009/0035859 A1 | 2/2009 | Johnson |
| 2009/0183986 A1 | 7/2009 | Johnson et al. |
| 2010/0129766 A1 | 5/2010 | Hilgers |
| 2010/0190127 A1 | 7/2010 | Ghantiwala et al. |
| 2011/0253525 A1 | 10/2011 | Johnson |
| 2011/0313513 A1 | 12/2011 | Johnson |
| 2012/0048432 A1 | 3/2012 | Johnson |

FOREIGN PATENT DOCUMENTS

| | | |
|---|---|---|
| EP | 1122526 | 8/2001 |
| EP | 1238600 | 9/2002 |
| GB | 2187951 | 9/1987 |
| JP | 48071713 A | 9/1973 |
| JP | 57161031 | 10/1982 |
| JP | 58088200 A | 5/1983 |
| JP | 59179771 | 10/1984 |
| JP | 07090624 | 4/1995 |
| JP | 10173306 | 6/1998 |
| JP | 2000185999 A | 7/2000 |
| SU | 1434314 | 10/1988 |
| WO | WO98/53362 | 11/1998 |
| WO | WO99/16387 A1 | 4/1999 |
| WO | WO 99/62432 | 12/1999 |
| WO | WO00/04204 | 1/2000 |
| WO | WO03/052150 | 6/2003 |
| WO | WO2005/108635 | 11/2005 |
| WO | WO2006/019943 | 2/2006 |

OTHER PUBLICATIONS

Xiaogdang, Ma; U.S. Appl. No. 10/972,759 entitled "Magnetic data storage system," filed Oct. 25, 2004.

Johnson, David et al.; U.S. Appl. No. 11/006,501 entitled "Anastomosis device and method," filed Dec. 6, 2004.

Johnson, David et al.; U.S. Appl. No. 11/041,185 entitled "Single crystal shape memory alloy devices and methods," filed Jan. 24, 2005.

Johnson, David; U.S. Appl. No. 11/415,885 entitled "Eyeglass frame," filed May 2, 2006.

Johnson, David; U.S. Appl. No. 11/420,157 entitled "Shape memory allow thin film, method of fabrication, and articles of manufacture," filed May 24, 2006.

Johnson, David; U.S. Appl. No. 11/526,138 entitled "Constant load bolt," filed Sep. 22, 2006.

Johnson, David; U.S. Appl. No. 11/859,697 entitled "Constant load fastener," filed Sep. 21, 2007.

Johnson, David et al.; U.S. Appl. No. 11/948,852 entitled "Method of alloying reactive elemental components," filed Nov. 30, 2007.

Johnson, David et al.; U.S. Appl. No. 11/949,663 entitled "Hyperelastic shape setting devices and fabrication methods," filed Dec. 3, 2007.

I. E.Viahhi; Robototechnic Constructions Based on CU—AL—NI Single Crystal Actuators; Proceedings of Second International Conference on Shape Memory and Superelastic Technologies; 1997; United States.

Pauling, Linus, College Chemistry, second edition, W.H. Freeman and Company, San Francisco, 1955, pp. 81-91.

Buchaillot L. et al., "Thin film of titanium/nickel shape memory alloy for multi-degree of freedom microactuators", Seisan Kenkyu, vol. 51, No. 8, 1999, pp. 22-23.

Johnson A. D. et al., "Application of shape memory alloys: advantages, disadvantages, and limitations", Micromachining and Microfabrication Process Technology VII, Oct. 22-24, 2001, San Francisco, CA, USA, vol. 4557, 2001, pp. 341-351.

Takabayashi et al., "Reversible shape memory alloy film fabricated by RF sputtering", Materials and Manufacturing Processes, vol. 13, No. 2, 1998, pp. 275-286.

Martynov, V., "TiNi thin films for microactuators and microdevices: sputter deposition and processing techniques", Thermec' 2003, Internat'l Conf. on Processing and Manufacturing of Advanced Materials, Jul. 7-11, 2003, Leganes, Madrid, Spain, Materials Science Forum, Jul. 7, 2003 vol. 426-432; pp. 3475-3480.

Johnson, Alfred David; U.S. Appl. No. 12/325,722 entitled "Biocompatible copper-based single-crystal shape memory alloys," filed Dec. 1, 2008.

Antonov et al.; New advances and developments in the Stepnakov method for the growth of shaped crystals; Crystallography Reports; vol. 47; Suppl. 1; 2002; pp. S43-S52.

(56) References Cited

OTHER PUBLICATIONS

Brice et al.; Crystal Growth; Ullmann's Encyclopedia of Industrial Chemistry; 2007; Wiley-VCH Verlag GmBH; pp. 1, 29-42, 50.

ElastametTM brochure from New Discovery Metals; 2007.

ElastametTM website screen capture, accessed Jul. 23, 2008.

Fu et al.; The growth characteristics with a shape memory effect; J. Phys.: Condens. Matter; vol. 4; 1992; pp. 8303-8310.

Morgan; Medical shape memory alloy applications—the market and its products; Materials Science and engineering A 378; 2004; pp. 16-23.

Qingfu et al.; Stabilisation of martensite during training of Cu—Al—Ni single crystals; Journal de Physique IV; Collloqu C2; Supplement to the Journa de Physique III; vol. 5; Feb. 1995; pp. 181-186.

Recarte et al.; Influence of Al and Ni concentration on the martensitic transformation in Cu—Al—Ni shape-memory alloys; Metallurgical and MaterialsTransactions A; vol. 33A; Aug. 2002; pp. 2581-2591.

Sittner et al.; Stress induced martensitic transformations in tension/torsion of CuAlNi single crystal tube; Scripta Materialia; vol. 48; 2003; pp. 1153-1159.

Sutuo et al.; Development of medical guide wire of Cu—Al—Mn-base superelastic alloy with functionally graded characteristics; Mater Res Part B: Appl Biomater; vol. 69B; 2004; pp. 64-69.

Wang et al.; Temperature memory effect in CuAlNi single crystalline and CuZnAl polycrystalline shape memory alloys; Thermochimica Acta; vol. 448; 2006; pp. 69-72.

Yahia et al.; Bioperformance of shape memory alloy single crystals; Bio-Medical Materials and Engineering; vol. 16; 2006; pp. 101-118.

Zhang et al.; Nanoscale pseudoelasticity of single-crystal Cu—Al—Ni shape-memory alooy induced by cyclic nanoindentation; J Mater Sci; vol. 41; 2006; pp. 5021-5024.

Zhang et al.; The variant selection criteria in single-crystal CuAlNi shape memory alloys; Smart Mater. Struct.; vol. 9; 2000; pp. 571-581.

Zhdanov et al.; Thermal stresses in tubes, produced from a melt by the Stepanov method, during their colling; Journal of Engineering Physics and Thermophysics; vol. 68; No. 1; 1995; pp. 80-89.

Dario et al.; Shape memory alloy microactuators for minimal invasive surgery; Proceedings of SMST-94 Conference; pp. 427-433; Pacific Grove CA; 1994.

Johnson, A. D.; Vacuum-deposited TiNi shape memory film: Characterization and applications in microdevices; J. Micromech. Microeng.; vol. 1; pp. 34-41; 1991.

Krulevitch et al.; Thin film shape memory alloy microactuators; J. Micromech. Microeng.; vol. 5; No. 4; 26 pgs.; 1996.

Schetky, L.M.; Shape-memory alloys; Scientific American, pp. 74-82; 1979.

Johnson et al.; U.S. Appl. No. 12/503,614 entitled "Sprinkler valve with active actuation," filed Jul. 15, 2009.

Christian et al.; The application of shape memory actuators in anthropomorphic upper limb prostheses; Artif. Organs; vol. 27; No. 5; pp. 473-477; 2003.

Gill et al.; Three-Dimensional Thin-Film Shape Memory Alloy Microactuator With Two-Way Effect; Journal of Microelectromechanical Sys.; vol. 11; No. 1; Feb. 2002; pp. 68-77.

Johnson, A. David; U.S. Appl. No. 12/952,002 entitled "Hyperelastic shape setting devices and fabrication methods," filed Nov. 22, 2010.

Creuziger et al.; Initial transformation around a notch tip in CuAlNi: experiment and modeling; Acta Materialia; vol. 56; pp. 518-526; 2008.

http://www.algor.com/news_pub/tech_reports/2005/rubber &foam/default.asp.

Johnson, Alfred David; U.S. Appl. No. 13/601,749 entitled "Fire Sprinkler Valve Actuator," filed Aug. 31, 2012.

US 5,772,989, 03/1998, Fitch et al. (withdrawn)

\* cited by examiner

Af measured with the fixture was:   -40C
Plateau stress:                     295 MPa
Pulled to:                          400 MPa Af measured with the fixture was:   +15 C
Plateau stress:                     157 MPa
Pulled to:                          400 MPa Stainless steel 4-40 screws DJ notched to 0.050" min diameter
(Max load 996 N)

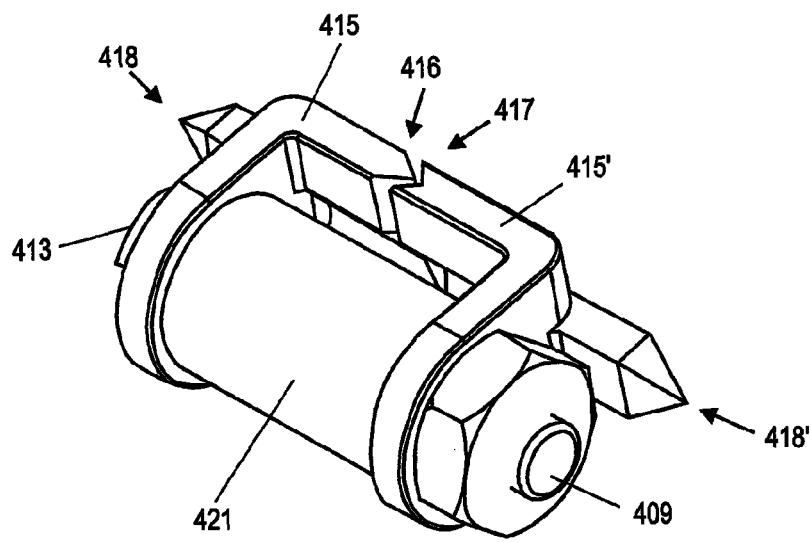
FIG. 4A
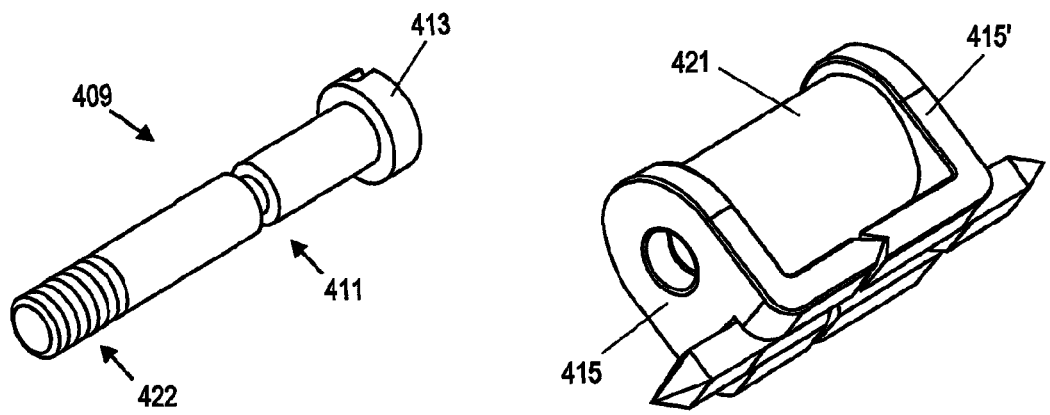
FIG. 4B    FIG. 4C

DETAIL A
SCALE 10 : 1

Cu-Al-Ni SCSMA

FRANGIBLE SHAPE MEMORY ALLOY FIRE SPRINKLER VALVE ACTUATOR

CROSS REFERENCE TO RELATED APPLICATIONS

This application claims the benefit under 35 U.S.C. §119 of U.S. Provisional Patent Application No. 60/897,708 (titled "SHAPE MEMORY ALLOY FIRE SPRINKLER VALVE ACTUATOR"), filed Jan. 25, 2007, which is incorporated by reference as if fully set forth herein.

STATEMENT AS TO FEDERALLY SPONSORED RESEARCH

This invention was made with Government support under Contract No. W31P4Q-05-C-0158 awarded by DARPA. The Government has certain rights in the invention.

INCORPORATION BY REFERENCE

All publications, patents, and patent applications mentioned in this specification are herein incorporated by reference in their entirety as if each individual publication or patent application was specifically and individually indicated to be incorporated by reference in its entirety.

BACKGROUND OF THE INVENTION

The present invention relates to fire safety devices, and more particularly to thermally actuated sprinklers commonly used in commercial and residential buildings.

Large numbers of thermally-actuated fire sprinklers are installed in structures every year. These sprinklers, generally installed in the structure's ceiling, are connected to a pressurized water supply and are intended to release the water into the room when the temperature in the room indicates that a fire or conflagration is taking place.

Multiple techniques have been used to actuate prior art fire sprinkler heads. Some prior art sprinkler valves bond two components together with alloys that melt at low temperatures. When heated above the melting temperature of the eutectic alloy, the bond between the two components is released, and a control valve is permitted to open. This type of actuator is subject to failure as the solder ages and crystallizes, thereby weakening the bond.

A second type of prior art sprinkler valve uses a sealed glass tube nearly filled with a liquid that boils at a low temperature. As ambient temperature increases, the liquid boils, thereby raising the pressure inside the tube. At a high enough temperature the tube ruptures, permitting the sprinkler valve to open. Premature failure may occur, however, if the sprinkler head is subjected to mechanical shock and the tube is cracked.

Yet other prior art sprinkler valves incorporate shape memory components that change shape when a transition temperature is reached to actuate the sprinkler valve. Some such thermally actuated valves are described in U.S. Pat. No. 4,176,719; U.S. Pat. No. 4,549,717; U.S. Pat. No. 4,596,483; U.S. Pat. No. 4,706,758; U.S. Pat. No. 4,848,388; U.S. Pat. No. 4,896,728; U.S. Pat. No. 5,117,916; U.S. Pat. No. 5,494,113; U.S. Pat. No. 5,622,225; U.S. Pat. No. 5,924,492; U.S. Pat. No. 6,073,700; U.S. Pat. No. 6,840,329; and U.S. Pat. No. 6,843,465. However, these devices do not typically control the transition temperature of the shape memory alloy, and the valve structures may therefore be less reliable and overly complex.

False triggering of sprinkler heads can cause damage that is expensive to repair and contributes to the cost of fire insurance. Thermally-actuated fire safety devices must meet strict codes. Described herein are thermally-activated, frangible sprinkler valves including a shape-memory element that may meet these codes and address many of the problems identified above.

SUMMARY OF THE INVENTION

Described herein are thermally-activated valves and methods or making and using them. The thermally-activated valves described herein are particularly useful as part of a sprinkler head, though they may be used as part of any appropriate thermally-activated valve.

In general, these thermally-activated sprinkler valve assemblies include: a temperature-sensitive actuator having a frangible bolt coupled to a shape-memory element, and a fluid passageway with a valved outlet. The temperature-sensitive actuator activates the sprinkler valve when the temperature of the shape-memory element reaches or exceeds the pre-determined temperature.

For example, described herein are thermally-activated sprinkler valve assemblies including a fluid passageway having an outlet (configured to connect to a source of pressurized fluid), a valve over the outlet, where the valve is configured to releasably oppose the force of the pressurized fluid, and a temperature-sensitive actuator coupled to the valve. The temperature-sensitive actuator includes a frangible bolt and a shape-memory element capable of elongating at a pre-determined stress and temperature, wherein the frangible bolt applies compressive force to the shape-memory element. The temperature-sensitive actuator is configured to actuate the valve by breaking the frangible bolt when the temperature of the shape-memory element reaches or exceeds the pre-determined temperature.

Any of the valve assemblies described herein may include a linkage that connects to the valve. For example, the temperature-sensitive actuator may be coupled to the valve through a linkage that is configured to oppose the force of pressurized fluid and thereby maintain the valve closed. The temperature-sensitive actuator may be positioned in parallel with the linkage.

Any appropriate linkage may be used. In general, a linkage links the actuator with the valve, and can be removed or displaced by the activation of the actuator. For example, a linkage may be a linkage bracket, a strut, or the like. In one variation, the linkage is a linkage bracket formed from two generally "T-shaped" brackets. The two linkages may connect to each other and to the valve along one axis (the top of the "T" shape); the actuator may be connected off-axis, between the bases of the "T" shape.

The temperature-sensitive actuator may be configured so that force from the pressurized fluid is not substantially transmitted to the shape-memory element. Transferring force from the fluid pressure to the shape-memory element may affect the strain profile of the shape-memory element, and alter the actuation temperature.

The plateau stress of the shape-memory element may be matched to the ultimate tensile strength of the frangible bolt. For example, the ultimate tensile strength of the frangible bolt (at which the bolt will break) may be approximately equal to the plateau stress of the shape-memory element. Matching the plateau stress and the ultimate tensile strength in this way may help insure that the actuator acts in a predictable fashion at a predetermined temperature.

The frangible bolt may be coupled or secured to the shape memory device by a nut or other securing means. For example, the bolt may be an elongate bolt that passes through a cylindrical shape-memory element. The bolt may be secured against either end of the shape-memory element with a flange and/or nut, placing compressive stress on the shape-memory element.

A valve assembly may also include a frame portion extending from the fluid passageway. For example, a valve assembly may include one or more arms that extend from the fluid passageway. The frame portion may provide support for other valve assembly components, such as the linkage.

The frangible bolt may be modified by including one or more notches or the like. The frangible bolt may be notched to set or determine the ultimate tensile strength of the bolt. A notch may be an annular notch or a side-notch (e.g., a notch on only one or more sides of the bolt). The notch is typically a small region (compared to the overall length of the bolt) that has a narrower diameter. A frangible bolt is typically an elongate shape, and may be cylindrical (e.g., columnar). Other elongate shapes may also be used. Commercially available bolts may also be used. For example, a titanium bolt (e.g., a Ti6Al4V bolt). Other bolts may also be used, including steel (stainless steel) or the like. The bolt may be threaded. For example, the bolt may be threaded at one or both ends, or along the entire length). The bolt may have a head (e.g., a flange) or may be used with washers and one or more nuts.

The shape-memory element may be made of any appropriate shape memory alloy. Shape-memory alloys capable of elongating up to 7%, 8% or 9% of their length are particularly useful in these actuators. In particular, the shape-memory element may be a single-crystal CuAlNi alloy or a single-crystal CuAlMn alloy. Shape-memory alloys capable of elongating greater than 7% (such as single-crystal SMAs) typically have a stress plateau that is longer than other (non single-crystal SMAs). This elongated stress plateau means that the actuator has a higher tolerance for breaking the frangible bolt and thereby actuating. In turn, this higher tolerance translates into a higher tolerance for the shape, type, orientation and compressive pressure applied by the frangible bolt component of the actuator.

The shape-memory element may be a tempered single-crystal shape memory alloy. Tempering (e.g., heat treating to precipitate Al from the single-crystal shape memory alloy) may be used to set the stress profile, including the temperature at which the actuator will actuate.

The shape-memory element may be any appropriate shape for coupling to the frangible bolt so that it can rupture (break) the bolt when actuation occurs. For example, the shape-memory element may be a cylinder at least partially surrounding the frangible bolt. The cylinder may have any appropriate cross-section (e.g., circular, elliptical, square, etc.). The shape-memory element may be a strut or partial tube (e.g., a half-cylinder, etc.).

Also described herein are thermally-activated sprinkler valve assemblies including a fluid passageway having a valved outlet and configured to connect to a source of pressurized fluid, a linkage coupled to the valved outlet and configured to oppose the force of pressurized fluid and thereby maintain the valve closed, and a temperature-sensitive actuator coupled to the linkage, wherein the temperature-sensitive actuator includes a frangible bolt, and a shape-memory element capable of elongating as much as eight percent at a pre-determined stress and temperature. The frangible bolt applies compressive force to the shape-memory element. Any of the features described above may also be included as part of this sprinkler valve assembly.

Also described herein are thermally-activated sprinkler valve assemblies including a fluid passageway having a valved outlet and configured to connect to a source of pressurized fluid, a linkage bracket coupled to the valved outlet and configured to oppose the force of pressurized fluid and thereby maintain the valve closed, and a temperature-sensitive actuator coupled to the linkage bracket. The temperature-sensitive actuator includes a frangible bolt and a shape-memory element capable of elongating as much as eight percent at a pre-determined stress and temperature, wherein a length of the frangible bolt applies compressive force to the shape-memory element, an further wherein the plateau stress of the shape-memory element is approximately the same as the ultimate tensile strength of the bolt.

Also described herein are methods of making a thermally-activated sprinkler valve assembly including the steps of: tuning a shape-memory element comprising single-crystal shape memory alloy to exert a pre-determined force at a pre-determined temperature; forming a temperature-sensitive actuator by coupling a frangible bolt to the shape-memory element so that the shape-memory element is compressed; and coupling the actuator to a linkage, wherein the linkage is configured to couple with the valve of a fluid passageway having a valved outlet to oppose fluid pressure and maintain the valve closed.

The step of tuning may include tempering the shape-memory alloy by a heat treatment process that causes controlled partial precipitation of Al.

The method may also include the step of coupling the linkage to the valve of the fluid passageway. For example, the step of coupling the actuator to the linkage may comprise coupling the actuator between two brackets forming the linkage.

The method may also include the step of matching the plateau stress of the shape-memory element to the ultimate tensile strength of the bolt.

The method may also include the step of connecting the fluid passageway to a fluid source. This step may also be used as part of a method for installing a frangible, temperature-sensitive shape memory actuator for a sprinkler valve.

BRIEF DESCRIPTION OF THE DRAWINGS

FIG. 4A shows a side perspective view of one variation of a temperature-sensitive actuator coupled to a linkage formed by two brackets. FIG. 4B shows the notched bolt of the actuator of FIG. 4A, and FIG. 4C shows the actuator and the linkage without the notched bolt.

DETAILED DESCRIPTION OF THE INVENTION

Figure 1A:
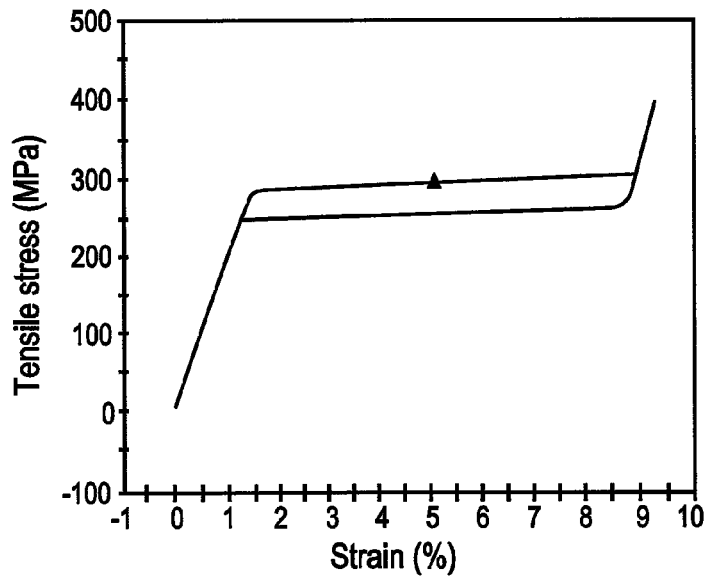
FIG. 1A is a stress-strain-temperature plot for CuAlNi single crystal shape memory alloy. The alloy is a CuAl (14.3%)Ni(4.5%), $A_f$=−40° C.

Described herein are thermally-activated sprinkler valve assemblies. These thermally-activated sprinkler valve assemblies may be configured to meet any appropriate performance specifications, particularly those agreed upon by standard-setting bodies such as Underwriter Laboratories (UL). For example, the thermally-activated sprinkler valve assemblies described herein may meet the UL Standards for Safety for Automatic Sprinklers for Fire Protection Service, US 199 ($10^{th}$ edition, Apr. 8, 1997, revised Dec. 8, 2003). In particular, the thermally-activated sprinkler valves described herein may outperform currently available frangible glass, eutectic, and other shape-memory based sprinkler valves because they may be made particularly vibration-insensitive, stable, and predictable.

In general, the thermally-activated sprinkler valve assemblies described herein include a fluid passageway having an outlet that is valved (over the outlet), and a temperature-sensitive actuator that can be activated to open the valve and allow fluid to flow from the sprinkler. The temperature-sensitive actuator typically includes a frangible bolt and a shape-memory element that is coupled to the bolt. Actuation occurs when the shape-memory element expands at a predetermined temperature to break the bolt.

The fluid passageway of the sprinkler may include a threaded tubular conduit portion which is adapted to be connected to a conduit network of a fire protection system. The conduit includes a fluid passage having an inlet for attachment to a pressurized fluid source, such as a pressurized water source, and an outlet. The fluid passageway may also be connected to a frame portion or body region, preferably made from a metal such as brass, stainless steel, or other durable, non-corroding conventional sprinkler frame material. For example, the frame may extend from the fluid passageway region distally and may have one or more arms. A deflector plate assembly for dispersing water when the sprinkler is active may also be attached. The fluid passageway is valved, and may include a valve plug. The valve communicates with a temperature-sensitive actuator that can be activated to open the otherwise closed valve. In some variations the temperature-sensitive actuator communicates with the valve through a linkage element, also referred to as a linkage, which is configured to oppose the force applied by the water pressure until activation. In these variations, activation of the sprinkler occurs when the actuator displaces the linkage, releasing the valve to open. In some variations, the frangible bolt acts as the linkage element.

The temperature-sensitive actuator (or just actuator) includes a frangible bolt and a shape-memory element that are coupled together so that expansion of the shape-memory element may result in breaking of the frangible bolt. The frangible bolt may also apply a compression stress on the shape-memory element.

A shape-memory element may be made of a single-crystal shape-memory alloy (SMA) that has a very large recoverable strain. For example, the recoverable strain may be more than nine percent. This shape-memory element is compressed and held under load by the frangible bolt. As described in more detail below, the frangible bolt may be notched or otherwise prepared to fracture at a preset stress and strain.

Figure 1B:
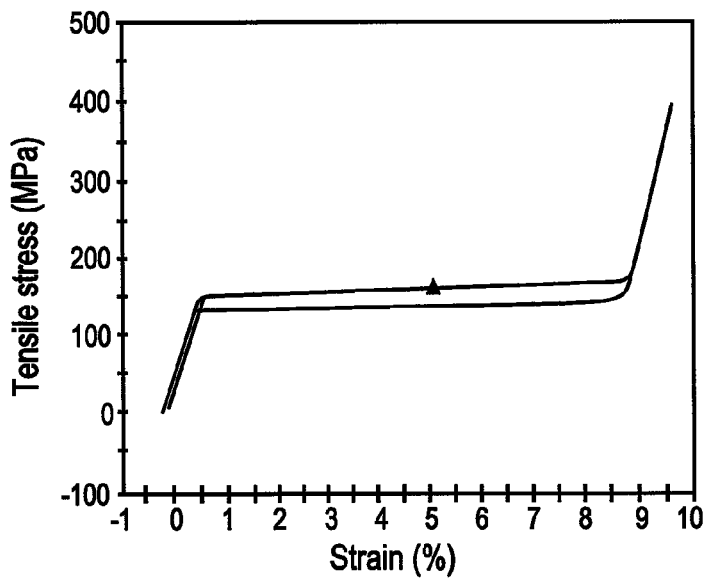
FIG. 1B is a stress-strain curve for CuAl(14.0%)Ni(4.5%), $A_f$=+15° C.
Figure 2A:
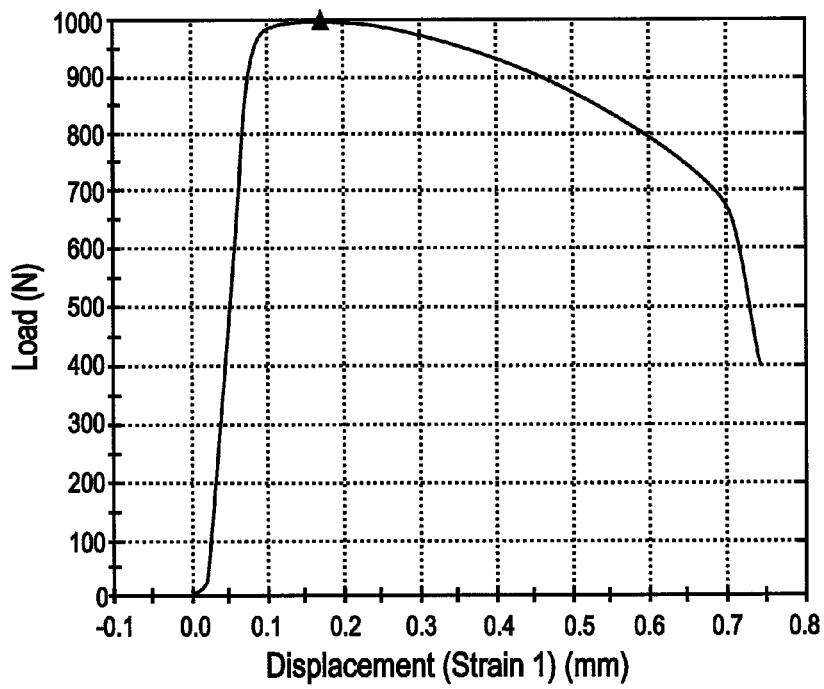
FIG. 2A is a stress-strain plot for a notched steel bolt showing its elongation to failure at the ultimate tensile stress of the steel. Tensile force reaches a maximum at the upper limit of elasticity, and diminishes as elongation continues, terminating in fracture at a fraction of one percent strain.
Figure 2B:
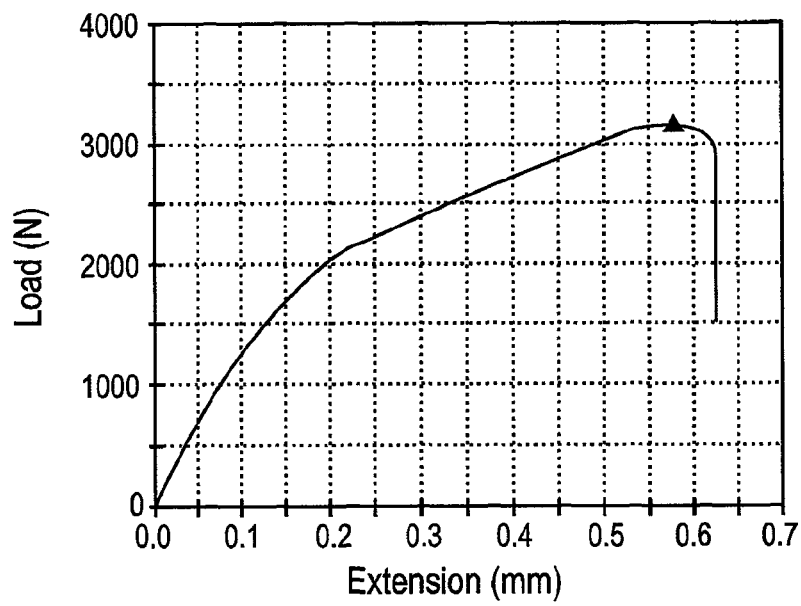
FIG. 2B is a stress-strain plot for a notched titanium bolt, showing the elongation to failure at the ultimate tensile stress. The titanium bolt was a Ti-6Al-4V bolt notched to 0.056 inch. The maximum tensile stress is approximately 1999.4 MPa. A diamond-shape Carbide insert notching tool having 35° angle and 0.015" tip radius was used to form the notch.

Single crystal shape memory alloys, in addition to having uniquely large recoverable strain, have a plateau in their stress-strain relationship that increases with increasing temperature in a highly predictable manner, as illustrated in FIGS. 1A and 1B. By adjusting composition, and by tempering to tune the temperature at which a specified stress (and hence force) is applied by the SMA element, it is possible to precisely match the force exerted by a frangible bolt, and to elongate it to failure. See FIG. 2A, showing the stress/strain relationship for a notched steel bolt, and FIG. 2B showing the stress/strain relationship for a notched titanium bolt.

Thus, a high-tolerance actuator may be made by matching the point on the stress/strain curve from the frangible bolt (the ultimate tensile strength) with the plateau stress of the shape-memory element. Matching these characteristics of the frangible bolt and the shape memory element allows selection of the precise temperature of actuation, which may be specified. Such precise actuators may therefore be manufactured at low cost, because this 'tuning' can be done only once per lot of material.

In assembling the valve, the actuator including the shape-memory element and the frangible bolt may be connected to the valve opposing the fluid pressure so that the force of the fluid pressure is not substantially communicated to the shape-memory element. For example, the SMA element and bolt may be offset from the force of the fluid pressure so that the fluid pressure force is not directly applied to either the bolt or the shape-memory element. This means that the bolt may be pre-loaded to its optimum tension (for the shape-memory element) independent of the force applied by the pressurized liquid. Since the force applied to the shape-memory element is not dependent on the (potentially variable) fluid pressure, the fluid pressure force will not alter the activation temperature for the actuator.

In general, the stress plateau in a CuAlNi (or CuAlMn) single crystal is related to the austenite finish temperature, $A_f$, of the material. The stress plateau is determined by the difference between $A_f$ and the actuation temperature multiplied by a constant (approximately 2.2 Mpa per °C.). For example, see FIG. 1A-1C. $A_f$ is the temperature at which transformation from martensite (low temperature phase) to austenite is completed at zero stress. $A_f$ is determined primarily by the composition of the ingot from which the crystal is grown. A composition of 81.2 weight percent Cu, 14.3 weight percent Al, and 4.5 weight percent Ni, for example, produces an $A_f$ transition temperature near −40° C.

Figure 1C:
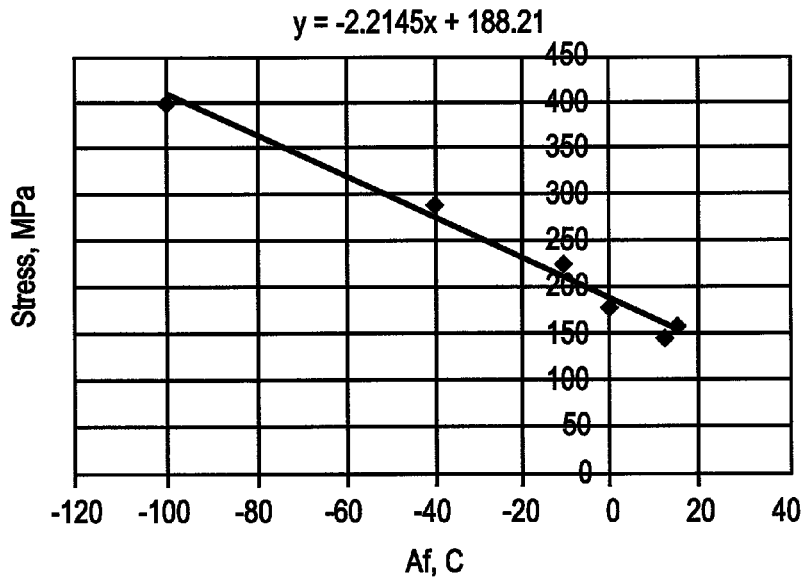
FIG. 1C is a correlation of $A_f$ with composition content of Al. The stress plateau increases 2.2 megapascals for each ° C. increase in ambient temperature.

Slight variations in composition, even of the order of 0.1 percent, can result in a significant variation of $A_f$, as shown in FIG. 1C. Such variations may result from weight measurement inaccuracies, or evaporation of metal from the melt before or during the crystal pulling operation, and so are difficult (if not impossible) to control with the precision necessary to meet sprinkler specifications. Actuation temperatures for sprinkler systems are preferably controlled within plus or minus about 3° C. This limitation may be overcome in the sprinkler valves described herein by tempering the SMA material used.

Figure 10:
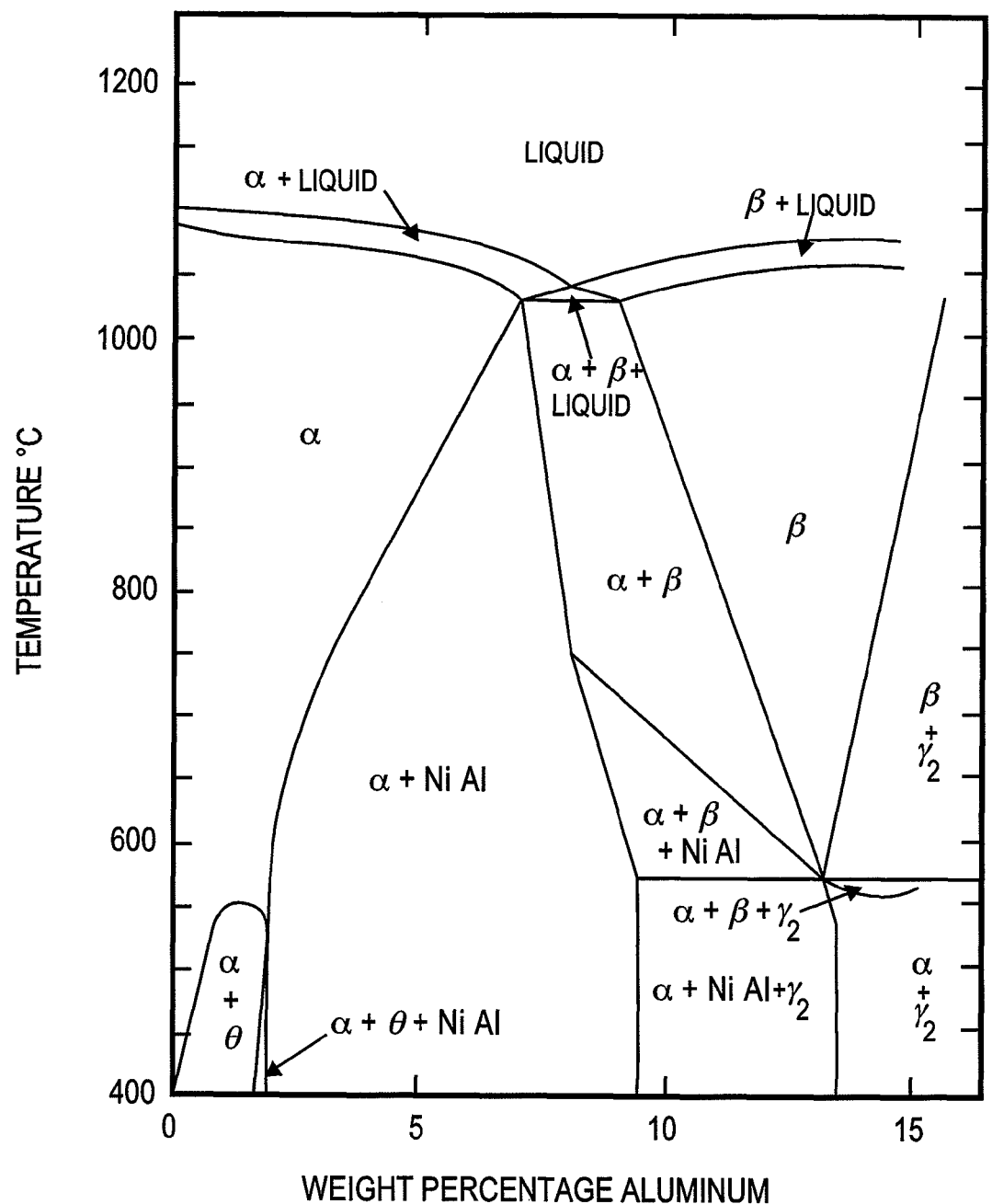
FIG. 10 is a phase diagram for CuAlNi(3%).

At elevated temperatures, Al gradually precipitates as nanocrystals. FIG. 10 shows a phase diagram for the CuAlNi alloy system showing the phases that may exist in molten alloy at various temperatures. Since nanocrystalline Al does not participate in the phase transformation, controlled precipitation of Al is a method of precisely tuning the $A_f$ of the material. Controlled selective precipitation for the purpose of adjusting the actuation temperature of the SMA is a unique form of tempering.

The shape-memory element provides the mechanical energy necessary to actuate the actuators described herein, and actuation occurs by breaking the frangible bolt and releasing the valve. For example, a shape-memory element may be a cylinder of single-crystal, hyperelastic CuAlNi having a transition temperature above room temperature with a stress plateau at about 200 Mpa. Other examples of shape-memory elements that may be used are provided herein, and generally the properties of the shape-memory element are matched to the properties of the bolt. In this first example, the shape-memory element is a cylinder with a cross-section that applies a force of 40 kg at the stress plateau to a bolt that fractures at 40 kg elongation force when elongated more than 3% of its length. The frangible bolt may be secured by a nut that pre-loads the bolt to a tensile 35 kg force (and thus applies an opposing compressive force to the shape memory element). The bolt applies this compressive force to the shape memory element. For example the shape-memory element may be compressed approximately 9 percent of its length while the SMA is in its martensitic state.

Figure 3A:
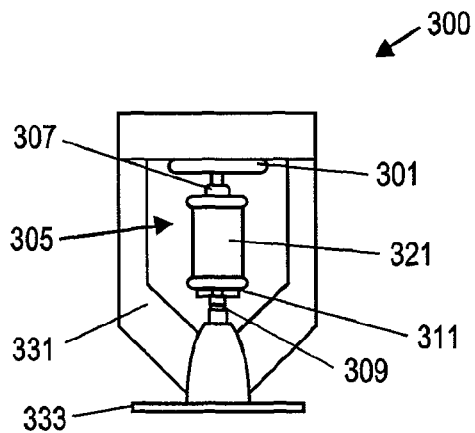
FIG. 3A shows a side view of one variation of a sprinkler including a thermally-activated sprinkler valve assembly.
Figure 3B:
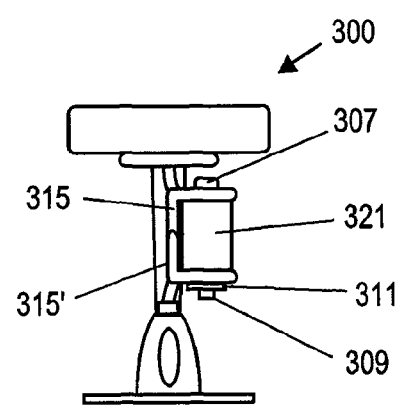
FIG. 3B is a front view of the same sprinkler shown in FIG. 3A.

FIGS. 3A and 3B shows one variation of a sprinkler having a thermally-activated sprinkler valve assembly as described. In this example, the sprinkler 300 includes a temperature-sensitive actuator 305, connected to a linkage 315, 315', which is held in communication with a valve (the outside 301 of which is visible in FIGS. 3A and 3B) and is supported by a frame 331 or body region. A deflector plate 333 is attached to (or integral with) the frame 331. The frame 331 in this example includes two arms.

The temperature-sensitive actuator 305 includes a frangible bolt 309, the bottom of which is visible in FIGS. 3A and 3B, which is secured to (and compresses) a shape-memory element 321 formed as a cylinder. The bolt is secured to linkage 315, 315' and held within the cylinder by a nut 307 on one end, and is also attached to a washer 311 on the opposite end. The linkage is formed by an upper bracket 315 and a lower bracket 315' that are held together between the valve 301 and the frame 331. When the temperature-sensitive actuator is activated by reaching or exceeding the pre-determined activation temperature, the shape-memory element will expand (e.g., greater than 5%, greater than 6%, greater than 7%, greater than 8% or greater than 9% of its compressed length), and break the frangible bolt 309. Breaking the frangible bolt causes the upper and lower brackets of the linkage to separate under the force provided by the source of liquid (e.g., water) pressure, and thereby release the valve opposing the force of the liquid pressure, allowing water to flow out of the valve. The water may strike the deflector plate. After activation, the temperature-sensitive actuator and the linkage may fall way from the rest of the sprinkler.

FIG. 3B shows a partial cut-away view of the sprinkler of FIG. 3A (in which one of the "arms" of the frame 331 have been removed). In FIG. 3B it is apparent that the linkage is formed by an upper 315 and lower 315' bracket that are configured so that the majority of the force of the liquid pressure is opposed by the linkage, and the temperature-sensitive actuator 305 is mounted in parallel to the linkage. Thus, the force exerted by the liquid pressure is not transferred to the frangible bolt via the linkage. The frangible bolt holds the two approximately right-angle-shaped linkage members secure until heat causes the SMA element to expand and fracture the frangible bolt, causing the linkage to collapse and release the fluid pressure. The compressive force on the shape-memory element is predominantly applied by the bolt 309, and the shape-memory element does not receive a substantial amount of the force from the fluid pressure.

In this example, it is significant that the force due to fluid pressure is transferred to the linkage and not to the frangible bolt because the actuator, consisting of the shape-memory element and frangible bolt, can be tuned to actuate at a predetermined temperature (and force) independent of the force exerted by the fluid force. If this were not so, the actual force seen by the frangible bolt may depend on the sum of the (variable) fluid force and the (constant) pre-load force, and the result would be undesirable variation of the actuation temperature.

FIG. 4A shows a perspective view of the temperature-sensitive actuator and linkage similar to that shown in FIGS. 3A and 3B. In this example, the shape-memory element 421 is a cylinder that is compressed by the frangible bolt 409 between two brackets 415, 415' forming a linkage. The two brackets in this example are nearly identical right-angle-shaped members 415, 415' that interconnect. One of the brackets 415 has a pointed (or male) end 416 that mates with concave (or female) end 417 on the other bracket 415'. The opposite ends of the brackets forming the linkage 418, 418' are also configured to releasably mate with the valve and/or the frame 331. In this example, these ends are pointed, but they may be rounded, blunt, or any other appropriate shape. The two brackets may be identical, each having one convex end and one concave end.

Figure 5A:
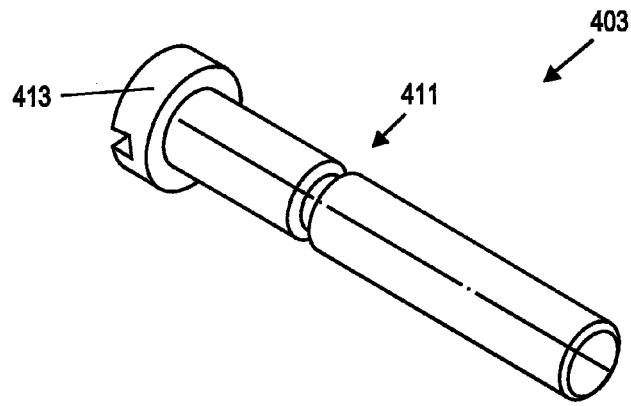
FIG. 5A is a perspective view of one variation of a notched frangible bolt.
Figure 5B:
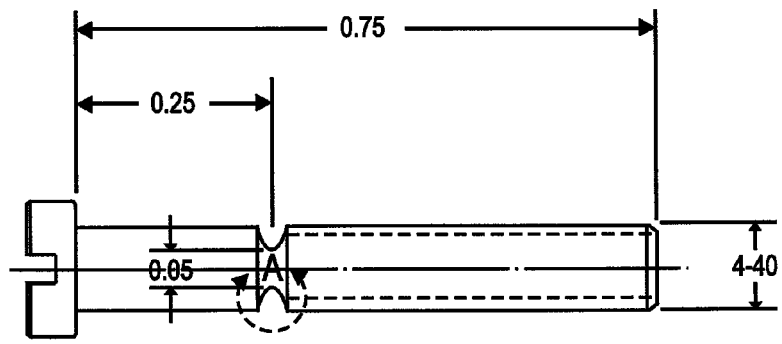
FIG. 5B is a side view of the frangible bolt of FIG. 5A, showing exemplary dimensions (inches).
Figure 5C:
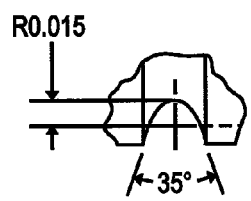
FIG. 5C is a detailed view of the notched region A indicated in FIG. 5B.

FIG. 4B shows the frangible pin from FIG. 4A removed from the temperature-sensitive actuator, and FIG. 4C shows the shape-memory element and linkage with the frangible pin removed. FIGS. 5A-5C also show greater detail of a frangible bolt.

Any appropriate frangible bolt may be used. In general, a frangible bolt is an elongate member. The frangible bolt may be a cylindrical bolt (as shown in FIGS. 4B-5B) including a threaded portion 422. The threads may mate with a nut. The entire bolt may be threaded or just one or more regions may be threaded. In some variations, the thread mates with the linkage. Other bolt shapes (including unthreaded bolts) may also be used. The bolt 409 may include a head region 413 that has a flanged portion extending outward from the elongate length of the bolt. The head region 413 in this example is slotted, but it may be otherwise configured for securing or gripping.

A frangible bolt may also be notched. In FIGS. 4B-5C the notch 411 is shown as an annular cut-out region. FIG. 5C illustrates this region in greater detail. The notch may be formed by any appropriate manner, including removing material from the bolt after it has been formed, or it may be cast as an initial part of the bolt. In some variations the notch does not extend annularly, but may be present on only one side or region of the bolt. Such asymmetric notching may help direct the fracturing of the frangible bolt. The depth of the notch may help set the ultimate tensile strength of the frangible bolt (the stress at which the bolt will fracture), and may therefore help match the bolt to the shape-memory element, as described below. The notch may be located at any position along the length of the bolt, and the location of the notch along the bolt may also help determine the ultimate tensile strength. In some variations the bolt may include only one notch or multiple notches.

The bolt may be made of any appropriate material, particularly metals including alloys. For example, the bolt may be a titanium bolt, such as a Ti6Al4V bolt, a steel (e.g., stainless steel) bolt, or the like.

Figure 6A:
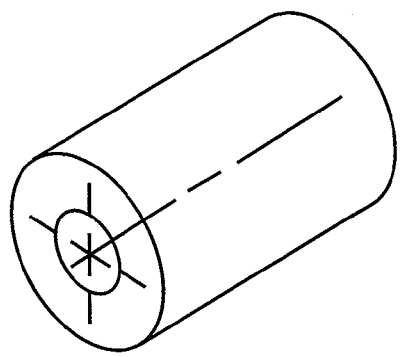
FIG. 6A is a perspective view of one variation of a shape-memory element for an actuator.
Figure 6B:
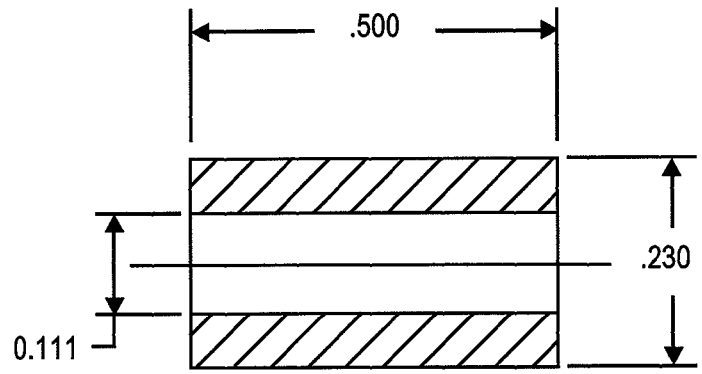
FIG. 6B is a cross-section through the shape-memory element of FIG. 6A, showing exemplary dimensions (inches).
Figure 6C:
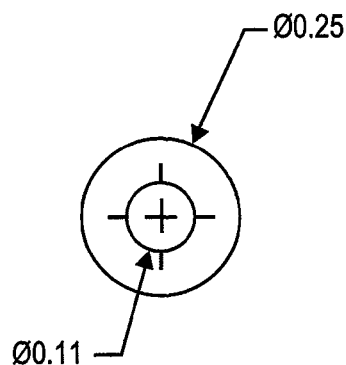
FIG. 6C is a top view of the shape-memory element of FIG. 6A.

FIGS. 6A-6C show one variation of a shape-memory element that may be used as part of a temperature-sensitive actuator, which is configured as a cylinder. FIG. 6A shows a perspective view of this cylindrical shape-memory element, which has a circular cross-sectional profile (shown in FIG. 6C). The shape-memory element has a length that is slightly less than length of the bolt. The cylindrical shape-memory element in this example is hollow, so that it can surround the frangible bolt.

Different configurations of shape-memory elements may be used. For example, a cylindrical shape-memory element may have a non-circular cross-section (e.g., an elliptical, cross-section, a square cross-section, etc.). The shape-memory element may be configured as a strut that is not hollow and which fastens to the bolt in two or more places. The shape-memory element may be a partial tube (e.g. a c-shaped tube).

The shape-memory element may be made of a single-crystal shape memory alloy, such as a single-crystal CuAlNi alloy or a single-crystal CuAlMn alloy. In particular, the shape-memory element may be made of a shape-memory material capable of elongating up to 7%, 8% or 9% of their length, referred to as "hyperelastic" shape memory alloys. The exact composition (percent composition) of the shape-memory alloy may be modified or pre-determined to help match the stress plateau characteristics of the shape-memory element with the stress profile (e.g., ultimate tensile strength) of the frangible bolt.

By matching the peak strength of the frangible bolt to the stress plateau of the shape-memory element, assured separation of the bolt is achieved in a narrow temperature range as the shape-memory element elongates much more than necessary to cause the frangible bolt to fracture.

Thus, the temperature-sensitive actuator may include a frangible bolt whose peak strength is matched to the stress plateau of the shape-memory element. For example, the temperature sensitive actuator may be made by first selecting a desired actuation temperature $A_t$.

For example, the actuation temperature, $A_t$, may be selected from within the range of about −200 to +200° C. An optimum stress plateau level ($S_p$) may then be chosen. For example, $S_p$ may be between 50 and 600 Mpa. The relationship between the stress plateau level and the activation temperature may be described by the formula:

$$S_p = 2.3(A_t - A_f)$$

Where $A_f$ is the austenite finish temperature of the shape-memory element, as described above. By choosing a cross-sectional area $X_c$ of the shape-memory element that applies force to the frangible bolt, the force exerted by the shape-memory element $F_a$ can then be determined from the relationship:

$$F_a = S_p * X_c$$

The ultimate strength of the frangible bolt (e.g., a notched frangible bolt) may then be matched to equal this force ($F_a$) and the elongation to failure=$E_f$, using a suitable margin of safety to determine the length of the shape-memory element $L_a$ such that, at the appropriate percent elongation (e.g., 5%, 6%, 7%, 8%, 9% elongation), the actuator will break the bolt while maintaining the margin of safety. These calculations should also take into account the compliance of other elements in the joint.

Based on this determination, the ingot composition that will produce single crystal material with $A_f$ can be chosen in order to make the shape-memory actuator. For example, if the shape-memory actuator is a cylinder, then a cylinder with a cross-section $X_c$, length $L_a$, and an opening large enough to accommodate the bolt may be fabricated.

The shape-memory element can then be compressed. For example, a press can be used to compress the actuator to its 9 percent limit, and to maintain this shortened length by keeping the actuator well below $A_f$.

To complete assembly of the temperature-sensitive actuator, the bolt, shape-memory element, and any other elements in the joint, such as a nut, can then be assembled. The nut can be tightened so that there is no slack in the joint. Finally, the remainder of the sprinkler valve body can be installed, including the linkage.

Any appropriate linkage may be used to connect the actuator to the sprinkler. In particular, it may be preferable to use a linkage that opposes the force of fluid (e.g., water pressure) when the device is connected to a source of fluid pressure and the valve is closed. In particular, it may be preferable to use linkages that do not transfer a substantial portion (if any) of the fluid pressure to the shape-memory element when the actuator is installed with the other components of the sprinkler.

A linkage may connect or couple with the valve that opposes the fluid pressure from a source of pressurized fluid that is connected to the fluid passageway of the device. For example, the linkage may abut or contact a portion of a valve (e.g., a valve plug), to prevent the fluid pressure from opening the valve. The linkage may also be connected or coupled to the body of the fluid passageway (or another portion of the sprinkler body that is connected to the body of the fluid passageway). In the example shown in FIG. 3A, the linkage is coupled to the frame 331. In some variations, the linkage may be configured to readily un-couple from the valve (and/or frame or sprinkler body) when the actuator triggers upon braking of the frangible bolt. In some variations, the frangible bolt may act as the linkage. For example, one end of the frangible bolt may be coupled to the valve, and the other end may be functionally coupled to a frame connected to the sprinkler body.

Figure 7A:
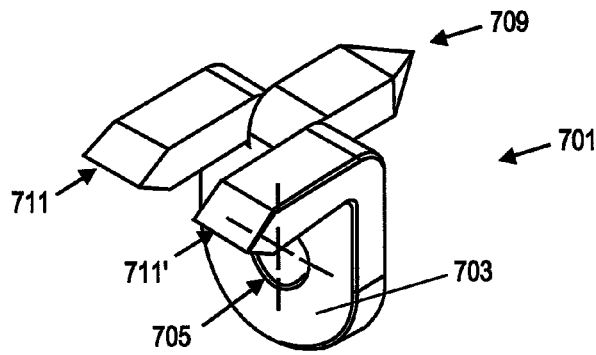
FIG. 7A is a perspective view of a first linkage bracket that may form a linkage.
Figure 7B:
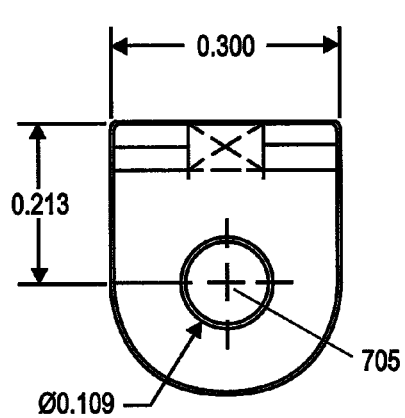
FIG. 7B is a first side view of the linkage bracket of FIG. 7A, with exemplary dimensions (inches)
Figure 7C:
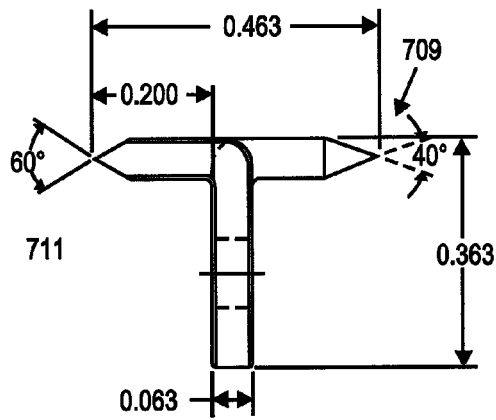
FIG. 7C is another side view of the linkage bracket.
Figure 7D:
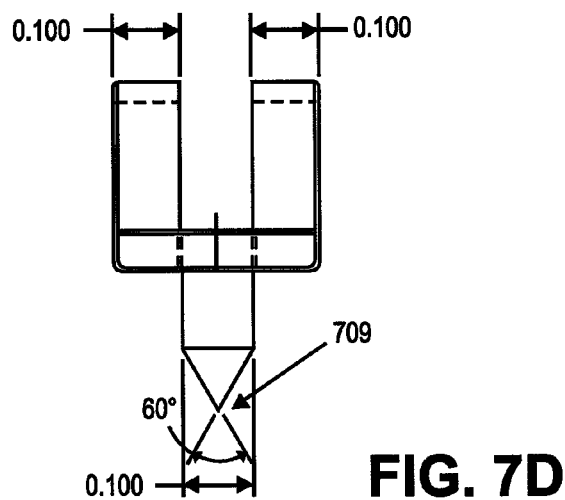
FIG. 7D is a top view of the linkage bracket of FIG. 7A.
Figure 8A:
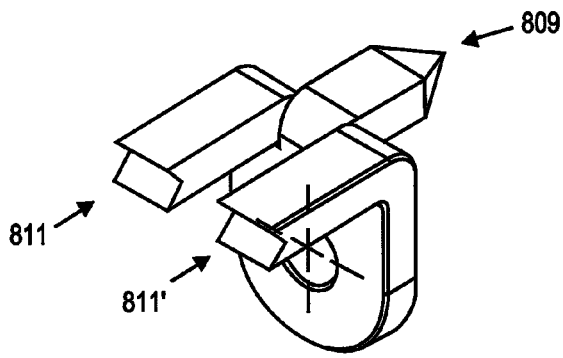
FIG. 8A is a perspective view of a second linkage bracket that may form a linkage.
Figure 8B:
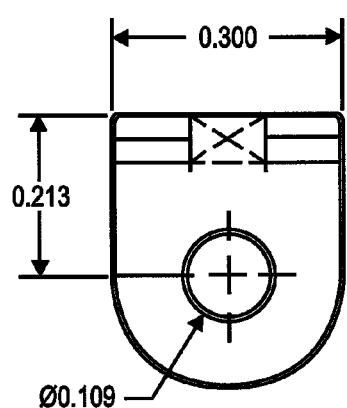
FIG. 8B is a first side view of the linkage bracket of FIG. 8A, with exemplary dimensions (inches)
Figure 8C:
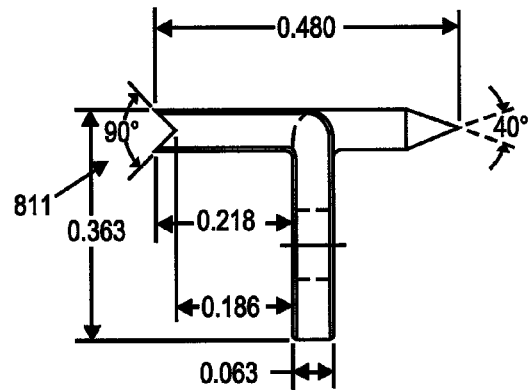
FIG. 8C is another side view of the linkage bracket.
Figure 8D:
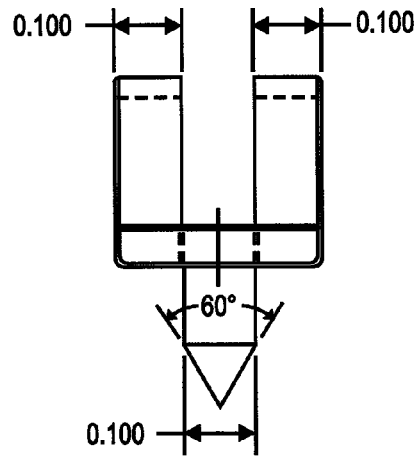
FIG. 8D is a top view of the linkage bracket of FIG. 8A.

A two-piece linkage, such as that shown in FIGS. 3A-3B, 4A and 4C may be particularly useful. In this example, the linkage includes an upper (or first) linkage bracket and a lower (or second) linkage bracket. FIGS. 7A-7D illustrate one variation of an upper linkage. FIG. 7A shows a perspective view of an upper linkage bracket 701 having a generally "T" shape. The bracket may be formed from a single (flat) piece of metal that is cut and bent to form the shape illustrated. The region of the bracket configured to hold the actuator 703 is formed by the base of the "T" shape, and may include a hole or passage 705 through which the actuator (e.g., the frangible bolt portion of the actuator) may pass. The top of the "T" shape in this linkage forms three prongs. One of the prongs 709 is configured to communicate with the valve, and the other two prongs 711 are configured to communicate with (e.g., mate with) prongs extending from the lower linkage. Although in this example three prongs are shown, two prongs may be used. Also, the orientation of the prongs may be different; for example, the two prongs 711 may be configured to couple with the valve and the single prong may be configured to couple with the other linkage. FIG. 7B shows a top view, and FIGS. 7C and 7D show sides view of the upper bracket 701.

FIGS. 8A-8D show an example of a lower bracket linkage that may be used with the upper bracket linkage of FIGS. 7A-7D to couple with an actuator and the valve of a fluid passageway. The lower bracket is very similar to the upper bracket, except that the two prongs that mate with the upper bracket prongs 811, 811' are shaped to receive the upper bracket prongs.

Figure 9:
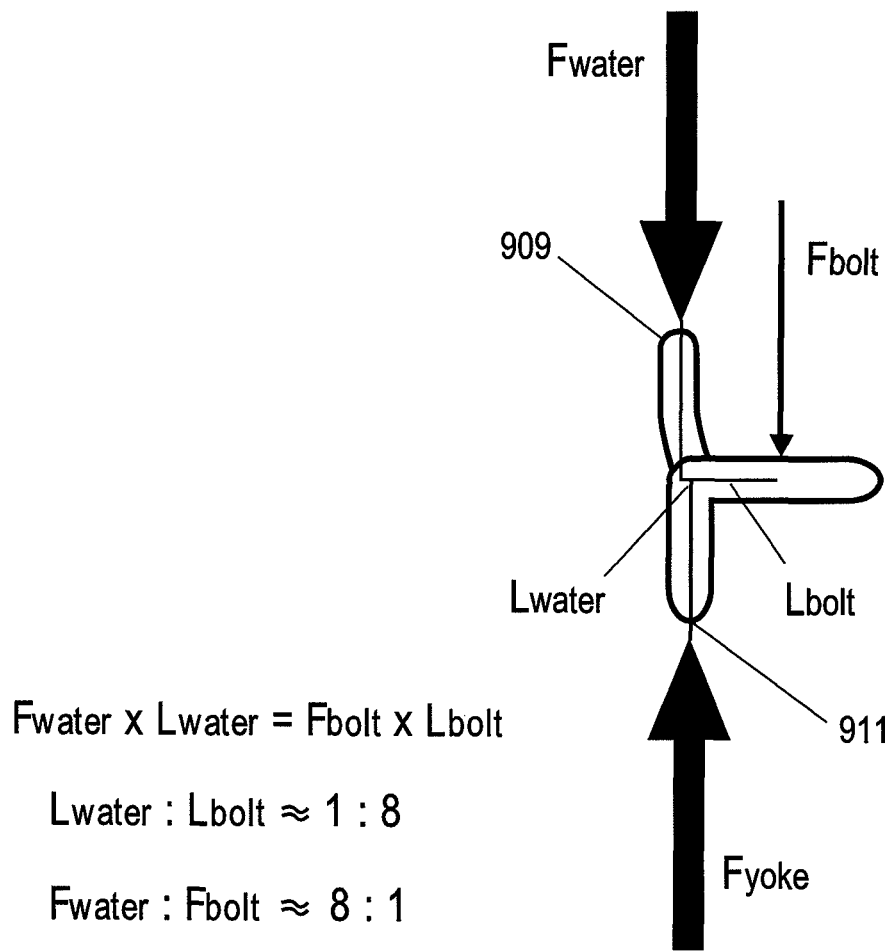
FIG. 9 illustrates forces acting on a portion of a linkage, and illustrates how a linkage may oppose the force of water pressure and impart direction to the actuator after activation.

The linkage may be configured so that the activation of the temperature-sensitive actuator causes a predictable release. For example, FIG. 9 illustrates the cross-section of another variation of an upper bracket that is configured so that activation of the actuator, and breaking of the frangible bolt, causes a predictable release. Although FIG. 9 shows only an upper bracket, a second, nearly identical lower bracket may have a similar design.

The upper bracket linkage shown in FIG. 9 is similar in orientation to the upper bracket linkage shown in FIG. 7C, only rotated 90 degrees counterclockwise. In this orientation, the first prong 909 of the bracket is configured to communication with the valve and oppose the force of the fluid pressure (indicated by $F_{water}$). The opposite prong 911 or prongs are configured to mate with a lower bracket linkage which in turn mates with the frame (also referred to as a "yoke") connected to the body of the fluid passageway. Thus, these prong(s) 911 receive the counter force, $F_{yoke}$, to help balance the $F_{water}$ and thereby keep the valve closed while the linkage is intact. In addition to the forces balance the fluid pressure, the bolt of the temperature-sensitive actuator also acts on the brackets by providing a force $F_{bolt}$ that is also opposed and balanced by the counterforce from the frame, $F_{yolk}$. At equilibrium, the force of the fluid pressure $F_{water}$ times the length of the lever arm $L_{water}$ (the length seen by the $F_{water}$ in relation to the opposing force $F_{yolk}$) is balanced by the force of the bolt, $F_{bolt}$, times the lever arm $L_{bolt}$, preventing the bracket from rotating and coming uncoupled. In the example of FIG. 9, the ratio between the lengths of the lever arms and the forces applied by the bolt and the fluid (water) on the bracket are generally balanced as a 1:8 ratio, but any appropriate ration may be used. During activation, the force applied to the bracket will unbalance as the bolt breaks, resulting in the rotation and uncoupling of the bracket, removing the linkage and releasing the valve.

A thermally-activated sprinkler valve assembly as illustrated may be made by any appropriate method, as mentioned above. In general, this method of making a thermally-activated sprinkler valve may include first tuning a shape-memory element to exert a pre-determined force at a pre-determined temperature. In some variations, tuning involves selecting the activation temperature ($A_t$), and setting the austenite finish temperature ($A_f$) based on that temperature. This may be accomplished in part by tempering. For example, a shape-memory element comprising single-crystal shape memory alloy can be tempered by heat treating and controlling the partial precipitation of Al from the single-crystal material. Tweaking the concentration of Al will adjust the $A_f$.

Tuning may include matching the plateau stress of the shape-memory element to the ultimate tensile stress (the breaking point) of the frangible bolt. Stress profile may be examined periodically to determine the plateau stress (as shown in FIGS. 1A and 1B), or it may be calculated. The shape-memory material may also be tuned by otherwise manipulating the composition of the shape-memory material (e.g., doping, etc.). The ultimate tensile strength of the bolt may also (or alternatively) be set based on the shape-memory element (e.g., the plateau stress). For example, the bolt shape and size may be selected to set the ultimate tensile strength. Thus, the bolt may be notched or otherwise treated to set the approximate ultimate tensile strength of the bolt.

The temperature-sensitive actuator may then be formed by coupling the frangible bolt to the shape-memory element so that the shape-memory element is compressed by the frangible bolt. Finally, the actuator may be attached to the rest of the thermally-activated sprinkler by coupling the actuator to a linkage, wherein the linkage is configured to couple with the valve of a fluid passageway having a valved outlet to oppose fluid pressure and maintain the valve closed.

The assembled sprinkler may then be attached to a fluid source.

EXAMPLES

Temperature-sensitive actuators were made by cutting shape-memory elements with an abrasive wheel from Cu-14.0Al-4.5Ni tubing (OD=0.235", ID=0.115"). No subsequent machining was performed. The shape-memory elements were approximately 0.451" to 0.478" long. The shape-memory elements were compressed and constrained with the brass 4-40 button headed notched screws and brass nuts. Notch size was 0.070"+−0.001". Assemblies were individually tested by immersion in hot water, the temperature of which was monitored with alkaline thermometer. The average actuation temperature was 49.375° C. (standard deviation of 1.96).

In another example, cylinders of shape-memory material were machined from 0.25" diameter Cu-14.0Al-4.5Ni (OD=0.23"; ID=0.11"; L=0.483"). Machined cylinders were compressed to L=0.450" and constrained with brass 4-40 button headed notched screws and brass nuts. Notch size is 0.070"+−0.001". On average, the devices actuated between 45-46° C. Afterwards, the cylinders were quenched from 950 C into salt water, compressed and constrained again, and actuated at an average temperature of 46.2° C. (standard deviation of 2.20). These shape-memory cylinders were compressed using frangible bolts made of 4-40 SS, having a notch of 0.070". These actuated at approximately 62° C. (screw strength—2550N).

In yet another example, shape-memory elements were machined from 0.25 "diameter Cu-13.9Al-4.5Ni rod (OD=0.23"; ID=0.11"; L=0.49"). These cylinders were quenched from 950° C. into salt water, compressed and constrained. In this example, lowering the Al content by 0.1% resulted in increase of actuation temperature by ~15 C.

Although the devices described herein are configured as sprinkler valves, other configurations may also be used with the temperature-sensitive actuators described. For example, a temperature-sensitive actuator may be used as part of a release valve for pressurized fluids including gasses. While the methods and devices have been described in some detail here by way of illustration and example, such illustration and example is for purposes of clarity of understanding only. It will be readily apparent to those of ordinary skill in the art in light of the teachings herein that certain changes and modifications may be made thereto without departing from the spirit and scope of the invention.

What is claimed is:

1. A thermally-activated sprinkler valve assembly comprising:
   a fluid passageway having an outlet and configured to connect to a source of pressurized fluid;
   a valve over the outlet, the valve configured to releasably oppose the force of the pressurized fluid; and
   a temperature-sensitive actuator coupled to the valve, the actuator comprising:
      a frangible bolt; and
      a shape-memory element capable of elongating at a pre-determined stress and temperature, wherein the frangible bolt applies compressive force to the shape-memory element;
      wherein the temperature-sensitive actuator is configured to actuate the valve by breaking the frangible bolt when the temperature of the shape-memory element reaches or exceeds the pre-determined temperature.

2. The valve assembly of claim 1, further wherein the temperature-sensitive actuator is coupled to the valve through a linkage that is configured to oppose the force of pressurized fluid and thereby maintain the valve closed.

3. The valve assembly of claim 2, wherein the temperature-sensitive actuator is positioned in parallel with the linkage.

4. The valved assembly of claim 1, wherein temperature-sensitive actuator is configured so that force from the pressurized fluid is not substantially transmitted to the shape-memory element.

5. The valve assembly of claim 1, wherein the plateau stress of the shape-memory element is approximately the same as the ultimate tensile strength of the bolt.

6. The valve assembly of claim 1, further comprising a nut securing the frangible bolt to the shape-memory element.

7. The valve assembly of claim 1, further comprising a frame portion extending from the fluid passageway.

8. The valve assembly of claim 1, wherein the frangible bolt is notched.

9. The valve assembly of claim 1, wherein the frangible bolt is a titanium bolt.

10. The valve assembly of claim 1, wherein the shape-memory element is a single-crystal CuAlNi alloy or a single-crystal CuAlMn alloy.

11. The valve assembly of claim 1, wherein the shape-memory element is a tempered single-crystal shape memory alloy.

12. The valve assembly of claim 1, wherein the shape-memory element comprises a cylinder at least partially surrounding the frangible bolt.

13. A thermally-activated sprinkler valve assembly comprising:
   a fluid passageway having a valved outlet and configured to connect to a source of pressurized fluid;
   a linkage coupled to the valved outlet and configured to oppose the force of pressurized fluid and thereby maintain the valve closed; and
   a temperature-sensitive actuator coupled to the linkage, wherein the temperature-sensitive actuator comprises:
      a frangible bolt; and
      a shape-memory element capable of elongating as much as eight percent at a pre-determined stress and temperature, wherein a length of the frangible bolt applies compressive force to the shape-memory element.

14. The valve assembly of claim 13, further comprising a nut securing the frangible bolt to the shape-memory element.

15. The valve assembly of claim 13, wherein the linkage comprises a bracket.

16. The valve assembly of claim 13, wherein the linkage comprises two T-shaped brackets.

17. The valve assembly of claim 13, wherein the frangible bolt is notched.

18. The valve assembly of claim 13, wherein the frangible bolt is a titanium bolt.

19. The valve assembly of claim 13, wherein the shape-memory element is a single-crystal CuAlNi alloy or a single-crystal CuAlMn alloy.

20. The valve assembly of claim 13, wherein the shape-memory element is a tempered single-crystal shape memory alloy.

21. The valve assembly of claim 13, wherein the shape-memory element comprises a cylinder at least partially surrounding the frangible bolt.

22. The valved assembly of claim 13, wherein temperature-sensitive actuator is configured so that force from the pressurized fluid is not substantially transmitted to the shape-memory element.

23. The valve assembly of claim 13, wherein the temperature-sensitive actuator is positioned in parallel with the linkage.

24. The valve assembly of claim 13, wherein the plateau stress of the shape-memory element is approximately the same as the ultimate tensile strength of the bolt.

25. A thermally-activated sprinkler valve assembly comprising:
   a fluid passageway having a valved outlet and configured to connect to a source of pressurized fluid;
   a linkage bracket coupled to the valved outlet and configured to oppose the force of pressurized fluid and thereby maintain the valve closed; and
   a temperature-sensitive actuator coupled to the linkage bracket, wherein the temperature-sensitive actuator comprises:
      a frangible bolt; and
      a shape-memory element capable of elongating as much as eight percent at a pre-determined stress and temperature, wherein a length of the frangible bolt applies compressive force to the shape-memory element, an further wherein the plateau stress of the shape-memory element is approximately the same as the ultimate tensile strength of the bolt.

* * * * *